United States Patent [19]

Maczuszenko et al.

[11] Patent Number: 4,734,722

[45] Date of Patent: Mar. 29, 1988

[54] ION GENERATOR STRUCTURE

[75] Inventors: Anjrzej Maczuszenko, Etobicoke; Paul E. Plasschaert, Limehouse; Ross Mair, Barrie, all of Canada

[73] Assignee: Delphax Systems, Mississauga, Canada

[21] Appl. No.: 812,210

[22] Filed: Dec. 23, 1985

[30] Foreign Application Priority Data

Dec. 24, 1984 [CA] Canada .................................. 470987

[51] Int. Cl.$^4$ ............................................. G01D 15/10

[52] U.S. Cl. ..................................... 346/159; 346/150

[58] Field of Search ................ 346/154, 150; 361/229; 355/3 CH, 14 CH; 350/326, 324

[56] References Cited

U.S. PATENT DOCUMENTS

| | | | |
|---|---|---|---|
| 3,958,162 | 5/1976 | Kuehnle | 361/229 |
| 4,056,723 | 11/1977 | Springett et al. | 250/326 |

FOREIGN PATENT DOCUMENTS

| | | | |
|---|---|---|---|
| 0118889 | 9/1984 | European Pat. Off. | 346/159 |

*Primary Examiner*—Arthur G. Evans

*Attorney, Agent, or Firm*—Rogers & Scott

[57] ABSTRACT

An ion generator for use with an electrostatic printer or the like to modify the electrostatic charge on a dielectric receptor surface is described. The generator includes a plurality of corona wires supported on a rod attached and to the rod. The wires are spaced angularly about the rod and a protector extends longitudinally around the rod and spaced radially from the wires. The protector has an axially extending window and an end piece is fixed to an outer end of the rod and journalled with an end of the protector to allow relative angular movement so that selected ones of the wires can be aligned with the window near the receptor surface. The window has an annular extent less than the spacing between adjacent wires so that for transportation the rod can be turned in the protector to place the wires to the sides of the window to minimize the risk of damage.

The ion generator can be combined with a housing mounted on the printer and the generator is designed for rotational engagement in the housing.

9 Claims, 11 Drawing Figures

ION GENERATOR STRUCTURE

STRUCTURE AND BACKGROUND OF THE INVENTION

The present invention relates to a corona device for use in modifying an electrostatic charge on dielectric surfaces, and more particularly to a corona erase device for use in an electrostatic printing apparatus to generate a supply of ions onto a rotating dielectric cylinder surface to modify or cancel any charge remaining on the cylinder surface after a latent electrostatic image has been transferred from the cylinder surface to a copy medium.

Corona devices are used both to place a uniform electrostatic charge on a dielectric surface and to eliminate an existing pattern of charge. Such actions are for the purposes of this description within the scope of the term "modifying an electrostatic charge on a dielectric surface".

The performance of a corona device is reduced by chemical compounds synthesized from the local air environment, which 'grow' on the surface of the electrode. Dielectric toner can also accumulate on the surface of the electrode which produces localised charging and this reduces the magnitude and the consistency of the corona current. These effects can substantially shorten the useful life of the corona electrode thereby requiring a relatively frequent replacement of the entire corona assembly. It is therefore desirable to provide an assembly having more than one corona wire to minimise down time and simplify replacement of a useless wire.

One attempt to provide a multiple corona wire assembly is shown in U.S. Pat. No. 4,056,723 to Springett. This patent teaches a rotatable corona device for use with xerographic reproduction apparatus and having multiple electrodes mounted on a rotatable cylinder. Each electrode has a conductive biasing member associated with it to control the magnitude and polarity of charge deposited on the surface of the cylinder. The device is rotatable so that any one of the electrodes can be located at a desired operational position adjacent the surface onto which charge is to be deposited. If one of the electrodes should fail, or become inefficient, the device can be manually or automatically moved to the next position.

The assembly requires a considerable number of components and is quite complex resulting in relatively high manufacturing costs. In addition, should a conductive biasing member fail then the particular electrode associated with it can no longer be used even if it is still operating satisfactorily. Therefore although this device solves some of the problems associated with single corona electrode devices it has serious limitations due to its cost, and doubtful reliability and efficiency.

An improvement over the Springett structure is to be found in European patent application No. 84300633.9 to Delphax Systems and which was published in the European Bulletin of Sept. 19, 1984. This structure includes a plurality of axially aligned corona electrodes spaced angularly about an elongate support member. A conductive biasing member is wrapped around both the support member and the electrodes. The biasing member is preferably a wire wrapped helically and a conductor extends the length of the coil to ensure continuity should the biasing member fail locally. Structure is provided to permit the support member to be rotated to bring a selected one of the electrodes into position where it is energised for use.

The Delphax Systems structure is a marked improvement over that taught by Springett but also suffers from several disadvantages.

The replaceable member carrying the electrodes has to slide into a housing in the machine and it can be damaged as this is done. Further, while handling, the electrodes and wire can also be damaged or contaminated resulting in poor performance. Lastly, another disadvantage is that the user can rotate the member in either direction so that it is possible to turn the member back to an old position which brings a faulty electrode into position for use. Further it is not evident to the user whether the structure has any useful electrodes or possibly that a new structure is needed because all of the electrodes are faulty or inoperable.

SUMMARY OF THE INVENTION

It is an object of the present invention to provide an improved corona device having multiple corona wires and which overcomes or at least mitigates the disadvantages of the prior art structures.

In one of its aspects the invention provides an ion generator for use with an electrostatic printer or the like to modify the electrostatic charge on a dielectric receptor surface. The generator includes a plurality of corona wires supported on a rod attached to the rod. The wires are spaced angularly about the rod and a protector extends longitudinally around the rod and spaced radially from the wires. The protector has an axially extending window and an end piece is fixed to an outer end of the rod and journalled with an end of the protector to allow relative angular movement so that selected ones of the wires can be aligned with the window near the receptor surface. The window has an annular extend less than the spacing between adjacent wires so that for transportation the rod can be turned in the protector to place the wires to the sides of the window to minimise the risk of damage.

In another of its aspects the invention provides a combination of a housing and an ion generator. The housing is to be mounted on the printer or the like and the generator is designed for engagement in the housing to rotate in the housing. The generator has more than one corona wire for use one at a time to provide ion generation to modify the charge on a receptor surface. Indexing means is provided coupled to the housing and the ion generator and including means locating the ion generator angularly with respect to the housing in one of the number of positions equal to the number of corona wires so that the wires can be used sequentially. These and other aspects of the invention will be better understood with reference to the following description taken in combination with the accompanying drawings, in which:

DESCRIPTION OF THE PREFERRED EMBODIMENT

Figure 1:
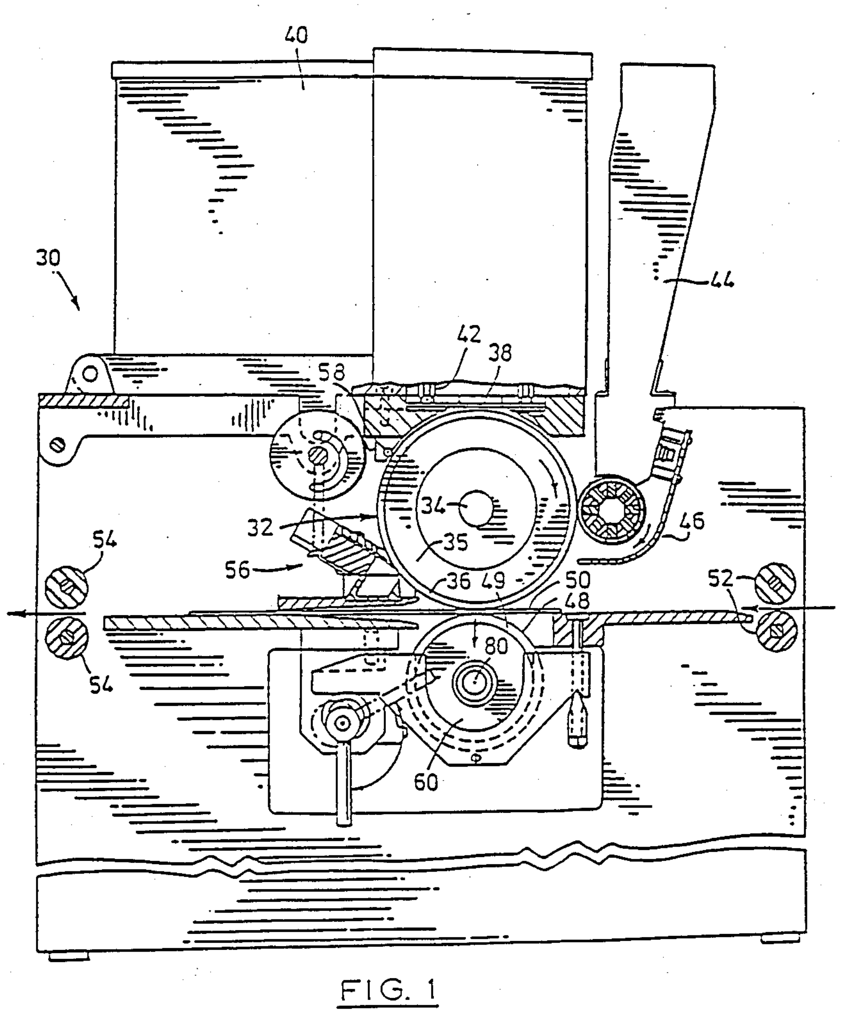
FIG. 1 is a schematic side view, mostly in section, of an exemplary electrostatic printer in which a preferred embodiment of the corona device is mounted for use in modifying a pattern of charge on a dielectric cylinder.

Reference is made first to FIG. 1 which shows somewhat schematically an exemplary electrostatic printer 30 incorporating the invention. This printer is illustrated primarily to demonstrate a suitable environment for the invention. Other printers and also photocopiers using photoreceptors could also benefit from the use of the invention. A cylinder 32 is mounted for rotation about an axis 34 and has an electrically conductive core 35 coated in a dielectric layer 36 capable of receiving an electrostatic image from a cartridge 38 driven by an electronic control system 40 and connected by mechanical connectors 42. As the cylinder rotates in the direction shown, an electrostatic image is formed by the cartridge 38 on the outer surface of the dielectric layer 36 and comes into contact with toner supplied from a hopper 44 by a feeder mechanism 46. The resulting toned image is carried by the cylinder 32 towards a nip formed with a pressure roller 48 having a compliant outer layer 49 positioned in a path of a receptor such as a paper 50 which enters between a pair of feed rollers 52, is driven by the cylinder 32 and rollor 48, and leaves between a pair of output rollers 54. The pressure in the nip is sufficient to cause the toner to transfer to the receptor 50 and with sufficient pressure, the toner will be fused to the receptor.

After passing through the nip between the cylinder 32 and the roller 48, any toner remaining on the surface of the dielectric layer 36 is removed by a scraper blade assembly 56, and any residual electrostatic charge remaining on the surface is neutralized by a corona device 58 positioned between the scraper blade assembly 56 and the cartridge 38.

Figure 2:
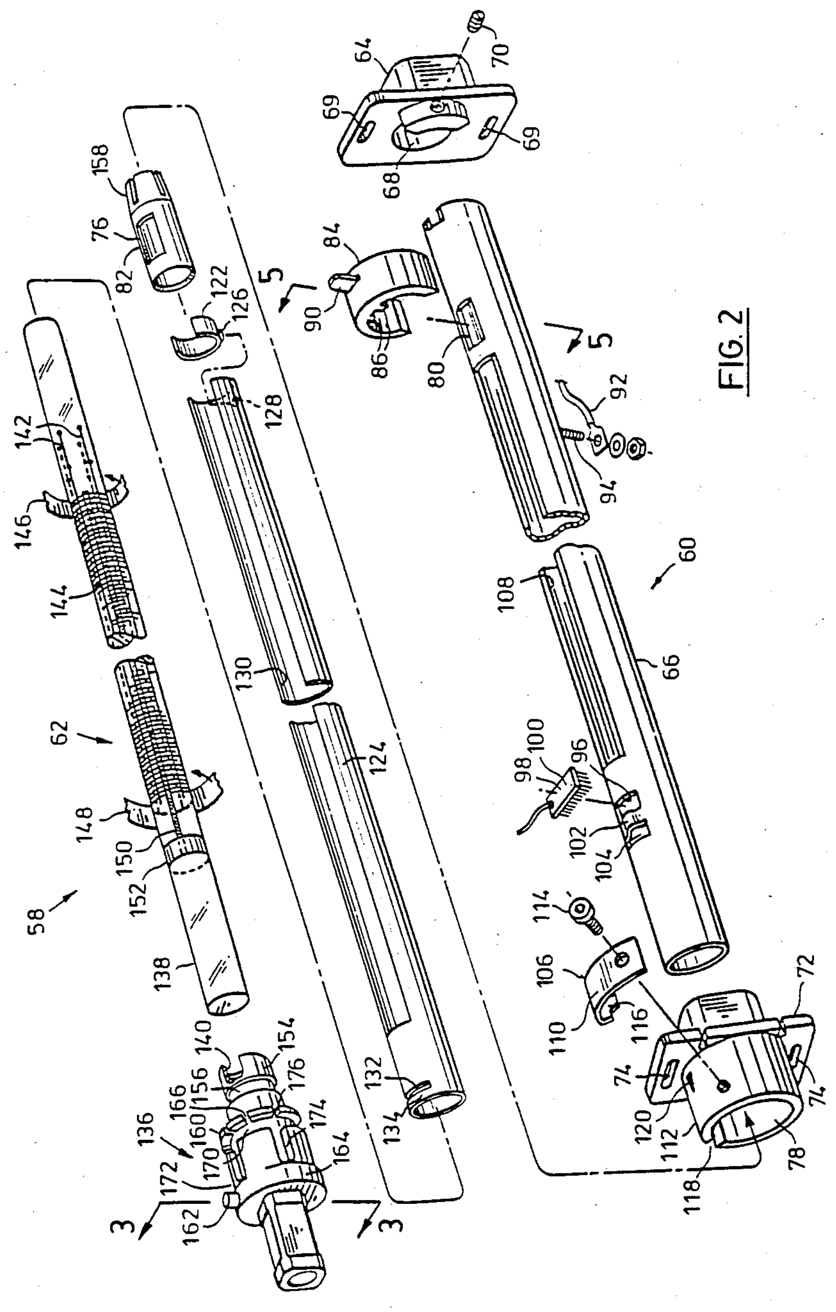
FIG. 2 is an exploded perspective view of the corona device and shown with the parts in their relative orientation for assembly in the printer.

Reference is now made to FIG. 2 to describe the major components and relationships after assembly of the corona device designated generally by the numeral 58. The device consists essentially of a housing 60 which receives an ion generator 62. The parts will be described with reference to their assembly in a machine commencing generally from the bottom right of FIG. 2 and working in reverse along the line indicating the center line of the components.

A mounting 64 of insulating synthetic plastic is first assembled on a suitable support 65 (FIG. 5) using screws 67 passing through slots 69 in flanges provided for the purpose. An elongate brass tube 66 is then engaged in an opening 68 and a set screw 70 is provided for retaining the tube in this mounting. At its other end, the tube is aligned with an insulating socket 72 which is pushed over the end of the tube and attached to the machine using screws 73 (FIG. 5) through slotted openings 74 in flanges provided on the socket in FIG. 2.

A sleeve 76 (drawn above the inner mounting 64 in FIG. 2) forms part of the housing 60. This sleeve is entered through an end opening 78 in the socket 72 and slid through the tube 66 to take up a position under a slot 80 which is in registration with a similar slot 82 in the sleeve. Preferably the sleeve is an insulator of a polycarbonate material and is held in place by a location piece 84 which is generally U-shaped for snapping over the tube 66 with a pair of longitudinally extending ribs 86 positioned through the slots 80, 82. These ribs trap the sleeve 76 in position within the tube. Brief reference is made to FIG. 5 which shows this detail to a larger scale and also shows a contact 88 positioned between the ribs and integral with a tab 90 extending through the location piece to receive an electrical connection shown in ghost outline in FIG. 5.

Turning to FIG. 2, after the location piece is in position, a grounding wire 92 is attached using conventional fasteners to a stud 94 attached permanently to the tube 66. Outwardly along the tube from the stud 94 is a rectangular opening 96 providing access through the tube for a brush contact 98 having an insulated backing 100 so that the brush can be engaged through the opening without contacting the tube. The brush is immediately adjacent a deformed bridge 102 which intrudes inside the tube for purposes which will be described. At this point it is sufficient to explain that the bridge 102 is capable of retaining the ion generator in alignment to prevent unwanted rotation. A further opening 104 is provided to permit deforming the bridge 102 without transmitting strain to the adjacent metal.

Socket 72 includes a locating device 106 for use in registering the ion generator to position individual electrodes centrally with respect to an elongate window 108 in the tube 66. (The operation of the locating device will be described in detail later) The device 106 consists of a curved spring 110 attached to a tubular portion 112 of the socket 72 by a screw 114 which projects through the tubular portion for location purposes. The spring 110 terminates in a tooth 116 of reduced width compared with the rest of the spring. On assembly, the tooth 116 extends through axial slot 118 in the tubular portion 112 and projects inwardly for engagement with the ion generator. The tooth 116 and screw 114 are disposed about the axis of the assembly by about 90 degrees and are each respectively offset by half of this angle with respect to an indicator arrowhead 120 on the top of the tubular portion 112.

With the housing assembled in the printer, the structure is ready to receive the ion generator. At this point some explanation of the intended arrangement would be beneficial in understanding the relationships between the components. It is intended that the ion generator be entered as a complete unit in a position in which the electrodes are protected as much as possible. The locating device 106 permits engagement short of a final position and once the ion generator has been entered this far, the locating device permits it to be rotated through 45 degrees and pushed home. It is then in position with one of the electrodes ready for use. Should this electrode fail, then the ion generator has to be pulled outwardly a small amount. The arranqement is such that it will then be impossible to move it outwardly any further or to move it clockwise. The user then rotates it anti-clockwise through 90 degrees using indicators on the generator as a guide and then pushes the generator home once again to get the next electrode in position. The procedure can be repeated a further twice so that all of the electrodes are used and each time an electrode is brought into play, it is impossible to move the generator into position to use a faulty electrode unless of course the user uses up all four and starts again. This would be an exceptional circumstance because the indicators advise which electrode is being used. With this introduction in mind, the ion generator shown in FIG. 2 will now be described.

Figure 4:
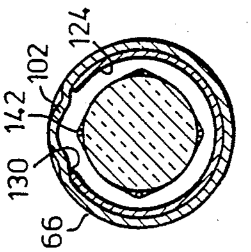
FIG. 4 is a sectional view on line 4—4 of FIG. 3.

Continuing along the center line, the next part as drawn after the sleeve 76, is a bush 122 of insulating material which is generally U-shaped. This bush sits inside an elongate and generally tubular protector 124 at an inner end of the protector located angularly by a small projection 126 which engages in a corresponding opening 128 in the protector. The protector defines an elongate slot or window 130 which on assembly is aligned with the window 108 in the tube 66. The bridge 102 of tube 66 intrudes in the window 130 to maintain both the protector and the tube in the same angular orientation as best seen in FIG. 4. The outer end of the protector has an annular peripheral slot 132 adjacent its end to define a narrow strap 134 which is used to locate the protector on an end piece 136 as will be described.

Figure 5:
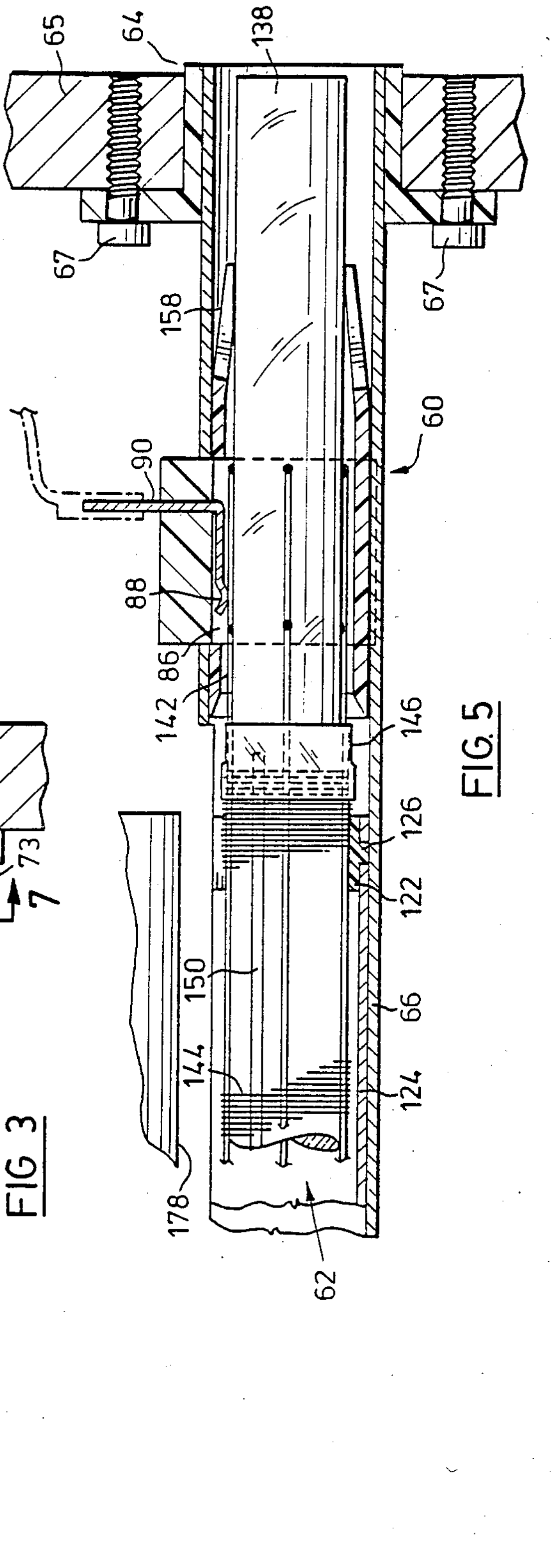
FIG. 5 is a sectional view similar to FIG. 3 and drawn on line 5—5 of FIG. 2.

Before assembling the protector and end piece, the end piece 136 receives a glass rod 138 which is sealed in an axial recess 140. The rod is preferably type 1720 sold by Corning Glass and is held in place by a suitable high temperature adhesive such as Ecco-Bond H 281 (trade mark of Emerson and Cummings, a division of W. R. Grace & Co). The rod 136 carries four electrodes 142 (two of which are seen) as well as a tungsten wire screen 144 made by wrapping a single conductor around the corona electrodes in a helical fashion and held in place by suitable tape 146, 148. The electrodes are tungsten wire sheathed in a high temperature glass which is stripped for engagement with contact 88 (FIG. 5). A high temperature epoxy resin is used to attach the electrodes to the glass rod.

To ensure continuity should the grid be damaged, and to feed the grid with a charge, a thin strip 150 of a conductive foil is laid axially under the grid and held in place by the grid. This foil terminates at a slip ring 152 for making contact via the brush contact 98 of the housing 60. Also, contact is made with the electrodes 142, selectively, by the contact 88 (FIG. 5) via the tab 90.

Continuing with the assembly, the rod 138 after being adhered to the end piece 136 is entered into the protector 124 and held centrally in the protector clear of the protector by its location in the end piece which has a boss 154 inside the protector and by the bush 122. The glass rod projects beyond the bush so that when it is assembled in the housing it will be engaged in the sleeve 76 to provide further support. After the glass rod has been positioned in the protector, the strap 134 on the outer end of the protector is deformed into a groove 156 outwardly of the boss 154. The deformation is sufficient to engage the strap in the groove but not sufficient to prevent free rotation of the end piece 136 relative to the protector 124 so that the end piece can be used to turn the glass rod and bring the electrodes into position for use.

Figure 8:
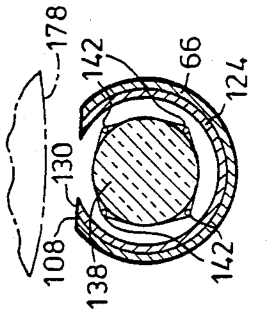
FIGS. 6–8 are sectional views respectively on lines 6, 7 and 8 of FIG. 3 but with the corona device assembled in the position shown in FIG. 2.

The assembly of the protector 124, glass rod 138 and end piece 136 forms the replaceable part of the corona device. It will be supplied with the electrodes in the positions shown in FIG. 8 to minimize the possibility of damaging the electrodes by rubbing or impact. This angular orientation is maintained during shipping and handling by taping the protector 124 to the end piece adjacent the strap 134 so that no rotation can take place with the tape in position. This is optional but has been proven to be a very satisfactory way to maintain the relationship.

Figure 7:
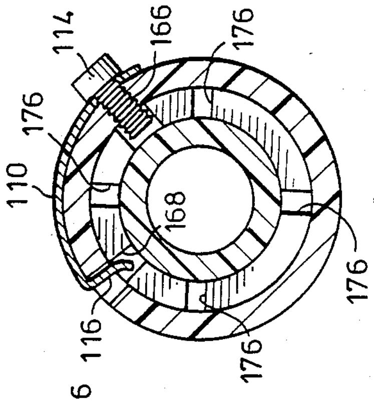

Having completed the preassembly of the housing and the ion generator, the parts are brought together by entering the glass rod in the opening 78 of the socket 72 and sliding this assembly through the tube 66. It will be evident from the sectional view shown in FIG. 8 that the protector 124 will ensure that as this assembly is taking place it is impossible to rub the electrodes and grid against any parts which could result in damage because the protector will act as a guide during the entry. When the glass rod reaches the sleeve 76, it is guided into the sleeve by a chamfered leading end of the sleeve and passes through the inner end of the sleeve which forms a collet 158 for better entering the rod and providing a positive anti-vibrational seating. The assembly continues until a ring structure 160 on the end piece collides both with the spring 110 and with the inner end of the screw 114 of the locating device. This collision can be avoided only if a peg 162 on a cylindrical shoulder 164 of the end piece is aligned with the arrowhead 120 of the socket. At this point, the ion generator can be moved axially because clearance is provided for the screw by a breach 166 in the ring structure 160. Reference is made briefly to FIG. 7 to show how the screw 114 fits in the breach 166 and also to show that a second breach 168 is provided for the tooth 116 on the spring 110. Consequently, (and turning to FIG. 2) with the peg 162 in alignment with the arrowhead 122, the ion generator can be moved axially until the tooth 116 and screw 114 enter an annular space 170 defined between the ring structure 160 and a generally cylindrical portion 172 of smaller diameter than the shoulder 164. This cylindrical portion defines four equally spaced axial recesses 174 so that by turning the ion generator anti-clockwise through 45 degrees, clearance is provided by two of the recesses 174 to permit the ion generator to move axially to bring the shoulder 164 into engagement with the outer end of the tubular portion 112 of the socket 72. This angular motion through 45 degrees brings an electrode into position for use as will be described with reference to FIGS. 6–11.

The ring structure 160, apart from defining the breaches 166, 168, also defines four slits 176 aligned axially with the recesses 174 and these slits are too narrow for the screw to pass through them. Consequently, the only way to remove the ion generator from the housing is to again align the screw and tooth of the spring with the breaches. It will therefore be evident that because the locating device 106 ensures that the ion generator can be moved only in an anti-clockwise direction, each of the four electrodes is brought into position before the ion generator can again reach its original angular orientation. Of course when this position is reached, the ion generator can be removed for replacement by a new generator. Details of these movements will also be described with reference to FIGS. 6–11.

Figure 3:
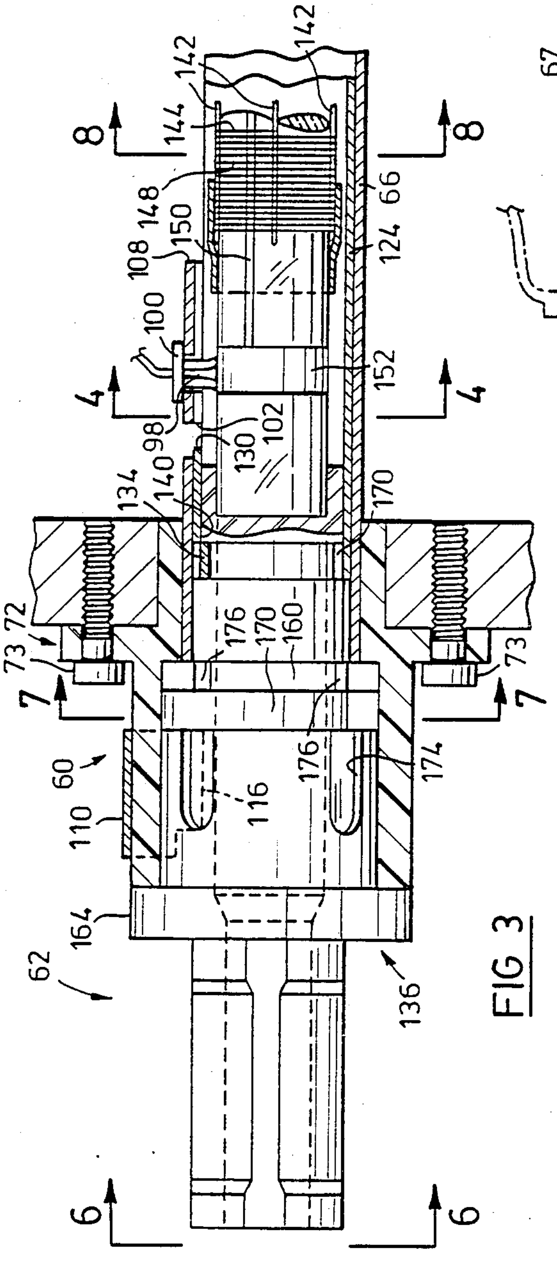
FIG. 3 is a sectional view generally on line 3—3 and to a larger scale than FIG. 2, the parts in this view shown in position after assembly and rotated to bring one of the electrodes into position for use.

Reference is next made to FIGS. 3–5 to describe more fully the interrelationships between the parts when the ion generator is in position in the housing with one of the electrodes 142 in position for use. It will be seen that compared with FIG. 2, the ion generator 62 has been rotated through 45 degrees bringing the tooth 166 into one of the recesses 174. Although the screw 144 cannot be seen in this view, it will appear in the upper of the two slots 174 of this view. Consequently unless the ion generator is moved axially, it cannot be rotated.

The bridge 102 is seen deformed inwardly where it is in engagement with sides of the window 130 as better seen in FIG. 4. This simple device ensures the alignment of the protector 124 in the tube 66 so that the respective windows 98 and 108 are in registration with the uppermost of the electrodes 142 (as drawn in FIG. 4) at the centre of the registered windows.

FIG. 3, also shows the strap 134 on the inner end of the protector deformed into the annular space 170 as previously described to hold the protector axially with reference to the end piece 136.

Reference is next made to FIG. 5 which shows the inner end of the ion generator 62 contained in the housing 60. It will be seen that the inner end of the glass rod 138 is located within the collet 158 and the contact 88 is touching the upper one of the electrodes 142 so that this electrode can be energized for providing ions on a dielectric surface 178.

Reference will next be made to FIGS. 6–11 to describe how the ion generator is engaged and rotated to bring into play each of the corona electrodes in turn and to avoid going back to a faulty electrode.

Figure 6:
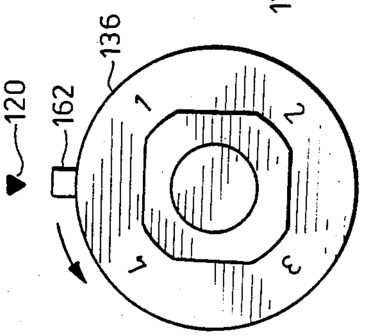

FIG. 6 shows the position of the end piece 136 and, for purposes of comparison, includes the arrowhead 120 drawn above the peg 162. This is the position an operator would see as the ion generator is engaged in the housing. The numbers 1 through 4 will be brought consecutively into alignment with the arrowhead, each one indicating that a corresponding one of the four electrodes is in position for use. However, staying for the moment with the initial entry, it will be seen that the electrode members are spaced to either side of the arrow indicating that the electrodes are in the position shown in FIG. 8 where they are protected from damage caused by invasion through the registered windows 130 and 108. Although not mentioned previously, the shapes of the windows are such that the edges lie generally in planar relationship to one another so that they can provide as much protection while at the same time not interfering by contact with the dielectric surface 178.

Figure 11:
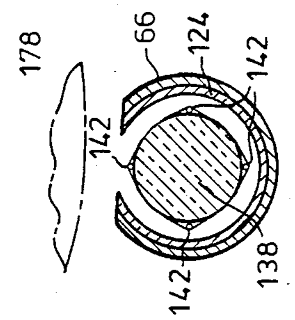
FIGS. 9–11 are views similar to FIGS. 6–8 and on the same section line but with the corona device in the position shown in FIG. 3.
Figure 10:
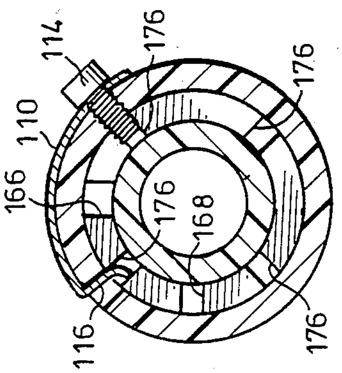
Figure 9:
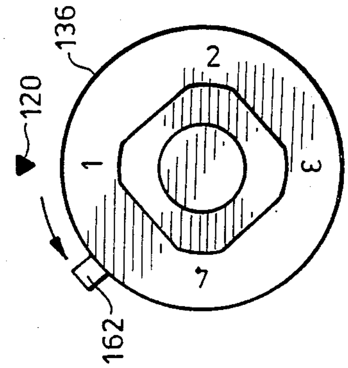

As seen in FIG. 7, the screw 114 and tooth 116 of the spring 110 are generally in alignment with two of the electrodes in this position. As mentioned earlier, it is impossible to move the ion generator to bring the screw into the space 170 (FIG. 2) unless this alignment is maintained. Once the ion generator has been engaged to this point, it is then possible to rotate the generator in an anti-clockwise direction as shown in FIG. 9. This is done until the number "1" is aligned with the arrowhead 120 and it will be evident to an operator when this happens because the tooth 116 will snap into one of the slits 176 and the operator will feel this "clicking" engagement. The alignment is now right to push the ion generator further into the housing so that the spring tooth and the screw are aligned in corresponding one of the recesses 174 seen in FIGS. 2 and 3. The number 1 electrode is then in position to be used as shown in FIG. 11.

Should the first electrode fail, the operator pulls the ion generator outwardly until the screw engages the ring structure 160 where it will stop because, although it is aligned with the slit, the screw is too big to pass through the slit. If the user tries to rotate the ion generator in a clockwise direction, the shape of the tooth is such that the spring will not deflect outwardly and the movement cannot be made. However, if the operator moves it in an anti-clockwise direction (which would be evident from the numbering on the shoulder of the ion generator), numeral 2 can be brought into position to replace numeral 1 and a further "clicking" feeling will indicate that the position has been reached. The operator then simply pushes the ion generator back in again and the second electrode is ready for use. This can be repeated for electrodes 3 and 4 and when the fourth electrode is no longer useful, the generator can be rotated through 45 degrees to return the structure into the FIG. 7 position for withdrawal with the screw and tooth passing through the respective breaches formed in the ring structure.

It will be evident that the number of electrodes used n the structure can be changed provided that similar changes are made to the end structure for indicating alignment of each of the electrodes individually. Similarly, although a specific form of electrode and grid have been described, evidentally the end structure arrangement could be used with different electrode assemblies while taking advantage of the inventive concept. These and other changes are within the scope of the invention as described and claimed.

We claim:

1. A corona device for use in modifying an electrostatic charge on a dielectric receptor surface of a printer and the like, the corona device comprising:

a housing attached to the printer and having an elongated tube defining a first window facing said surface, an inner mounting supporting an inner end of the tube and a socket supporting the outer end of the tube, and location means;

an ion generator comprising an elongate support rod, a plurality of corona wires extending axially and spaced angularly about the rod, a protector encasing the rod and spaced radially from the corona wires, the protector defining a second window and being adapted to enter the tube through the socket with the said windows in registration and the tube and protector including means maintaining said registration, and an end piece attached to the end of the rod for moving the rod angularly and being coupled for relative angular movement to the protector; and the end piece being engageable for rotation in the socket to permit the end piece to rotate the rod to bring a selected one of the corona wires into alignment with the windows for energizing to modify the said electrostatic charge on the dielectric receptor surface.

2. A corona device for use in modifying an electrostatic charge on a dielectric receptor surface of a printer and the like, the corona device comprising;

a housing for mounting on the printer;

an ion generator for engaging the housing to rotate in the housing, the generator having more than one corona wire for use one at a time to provide ion generation to modify said charge; and indexing means coupled to the housing and the ion generator and including resiliently biased means for releasably engaging and locating the ion generator angularly with respect to the housing in one of a number of positions equal to the number of corona wires as the ion generator is rotated in the housing, the resiliently biased means arranged to permit rotation of the ion generator in only one direction relative to the housing so that the wires are used sequentially.

3. A replaceable ion generator for use with an electrostatic printer having a suitable ion generator housing, the generator comprising:

a support rod;

a plurality of corona wires attached to the support rod and spaced angularly about the support rod;

a protector extending about the rod and spaced radially from the wires, the protector having an axially extending window;

a bush located in the protector for rotatably receiving an end of the rod in spaced relationship to the protector; and an end piece fixed to another end of the rod and journalled with an end of the protector to allow angular movement of the rod relative to the protector so that selected ones of the wires can be aligned with the window at an exposed location, the window having an annular extent less than the spacing between adjacent wires so that the rod can be located in the protector with the wires out of alignment with the window in unexposed locations to minimise the risk of damage thereto during transportation and handling.

4. A device as claimed in claim 1, in which the end piece attached to the end of the rod and the socket include resiliently biased engagement means for releasably locating the rod in the socket in selected ones of a plurality of angularly spaced locations in each of which locations one of the corona wires is in alignment with the windows.

5. A device as claimed in claim 4, in which the resiliently biased engagement means is arranged to permit rotation of the rod in only one direction relative to the housing and protector when the end piece is in engagement with the socket and the protector is in registration with the housing.

6. A device as claimed in claim 5 in which the resiliently biased engagement means is formed of a curved spring having a first end fixed to the socket from which the spring extends around the socket, in the direction of permitted rotation of the rod, to a free end of the spring extending radially inwardly and biased to engage selected ones of a plurality of recesses in the socket.

7. A device as claimed in claim 4 in which means are provided on the end piece and the socket to provide a visual indication of the positions of the rod in the socket corresponding to the locations in which the corona wires are in alignment with the windows.

8. A device as claimed in claim 1, in which the socket has a radially inwardly directed retaining member and the end piece defines a radially outwardly extending ring structure for abutting the retaining member to retain the ion generator in the housing, a portion of the ring struture defining a axial slot to allow passage of the retaining member, and thus withdrawal of the ion generator from the housing, when the slot and the retaining member are aligned.

9. A device as claimed in claim 8 in which means are provided on the end piece and the socket to provide a visual indication of the position of the rod in the socket corresponding to the location in which the slot and retaining member are aligned.

* * * * *